(12) United States Patent
Walker

(10) Patent No.: US 8,485,908 B2
(45) Date of Patent: Jul. 16, 2013

(54) FLEXIBLE COUPLER

(75) Inventor: Dean M. Walker, Ft. Collins, CO (US)

(73) Assignee: Walker Manufacturing, Ft. Collins, CO (US)

( * ) Notice: Subject to any disclaimer, the term of this patent is extended or adjusted under 35 U.S.C. 154(b) by 0 days.

(21) Appl. No.: 13/187,186

(22) Filed: Jul. 20, 2011

(65) Prior Publication Data

US 2013/0023348 A1    Jan. 24, 2013

(51) Int. Cl.
*F16D 3/68*   (2006.01)
(52) U.S. Cl.
USPC ............................................ 464/76; 464/85
(58) Field of Classification Search
USPC ............... 464/73, 76, 83, 85, 89, 90, 91, 93
See application file for complete search history.

(56) References Cited

U.S. PATENT DOCUMENTS

| | | | | |
|---|---|---|---|---|
| 3,438,221 A | * | 4/1969 | Paulsen | 464/76 |
| 3,902,333 A | * | 9/1975 | Dossier | 464/73 |
| 4,527,986 A | * | 7/1985 | Bridgewater et al. | 464/73 |
| 4,671,780 A | * | 6/1987 | Weir | 464/85 |
| 4,743,218 A | * | 5/1988 | Aubrey et al. | 464/76 |
| 4,943,261 A | * | 7/1990 | Smith | 464/76 |
| 7,052,399 B2 | * | 5/2006 | Duggan | 464/93 X |

FOREIGN PATENT DOCUMENTS

| | | | | |
|---|---|---|---|---|
| DE | 2029223 C | * | 6/1970 | |
| GB | 377454 | * | 7/1932 | |
| JP | 61218832 A | * | 9/1986 | |

\* cited by examiner

*Primary Examiner* — Gregory Binda
*Assistant Examiner* — Matthieu Setliff
(74) *Attorney, Agent, or Firm* — Krajec Patent Offices, LLC; Russell S. Krajec

(57) ABSTRACT

A flexible coupler for rotary power transmission may have several rubber bushings oriented in a circle about a coupler axis. The bushings may join two flanged components to form a single coupler. A single coupler may be used in applications where the axes of two transmission shafts are not parallel. Two couplers may be joined by a transmission shaft for applications where the axes of two transmission shafts may be parallel but offset from each other.

13 Claims, 4 Drawing Sheets

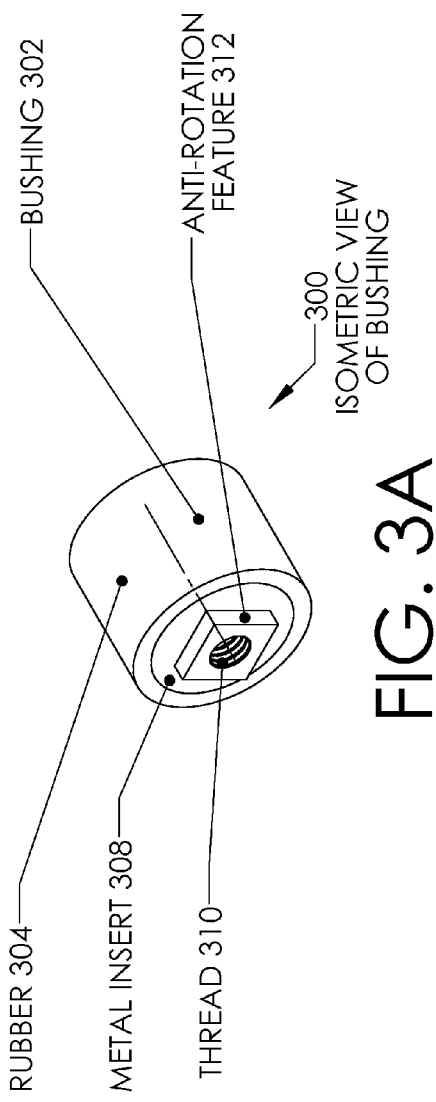
FIG. 3A
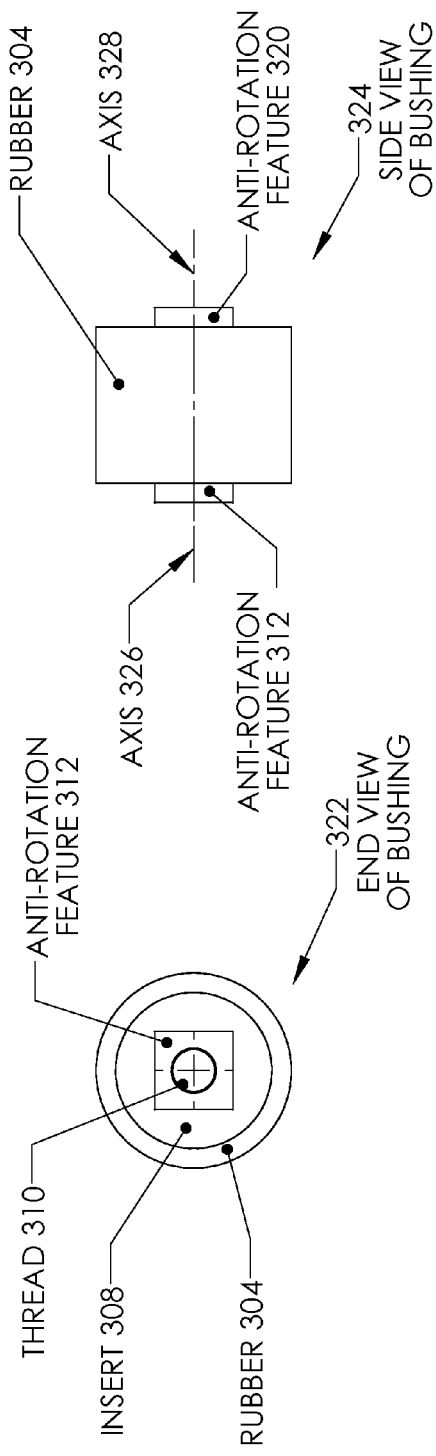
FIG. 3C
FIG. 3B

FLEXIBLE COUPLER

BACKGROUND

When connecting power transmission devices, it is very difficult to accurately align transmission shafts. When transmission shafts are misaligned and rigidly connected, the transmission components often have a high degree of wear in the bearings that support the transmission shafts in the power transmission devices.

Further, rigid connections between power transmission devices may allow vibrations or other forces to be transmitted between devices, further adding to wear and tear on the devices.

SUMMARY

A flexible coupler for rotary power transmission may have several rubber bushings oriented in a circle about a coupler axis. The bushings may join two flanged components to form a single coupler. A single coupler may be used in applications where the axes of two transmission shafts are not parallel. Two couplers may be joined by a transmission shaft for applications where the axes of two transmission shafts may be parallel but offset from each other.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

In the drawings,

FIG. 3A is an isometric illustration of an embodiment showing a bushing.

FIG. 3B is an end view of the bushing illustrated in FIG. 3A.

FIG. 3C is an side view of the bushing illustrated in FIG. 3B.

DETAILED DESCRIPTION

A flexible coupler may join two driveshafts in various power transmission applications. The coupler may be constructed from pairs of flanges that may be joined by multiple bushings that may be arranged along a circle perpendicular to the driveshaft axis. The bushings may flex to provide cushioning and vibration resistance, and may also flex to account for misalignment in the driveshafts.

The coupler may be constructed in a single or double coupler configuration. A single coupler may have two flanges joined by several bushings, while the double coupler may have two sets of the single coupler. The double coupler may be joined using an intermediate driveshaft in some instances.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

Figure 1:
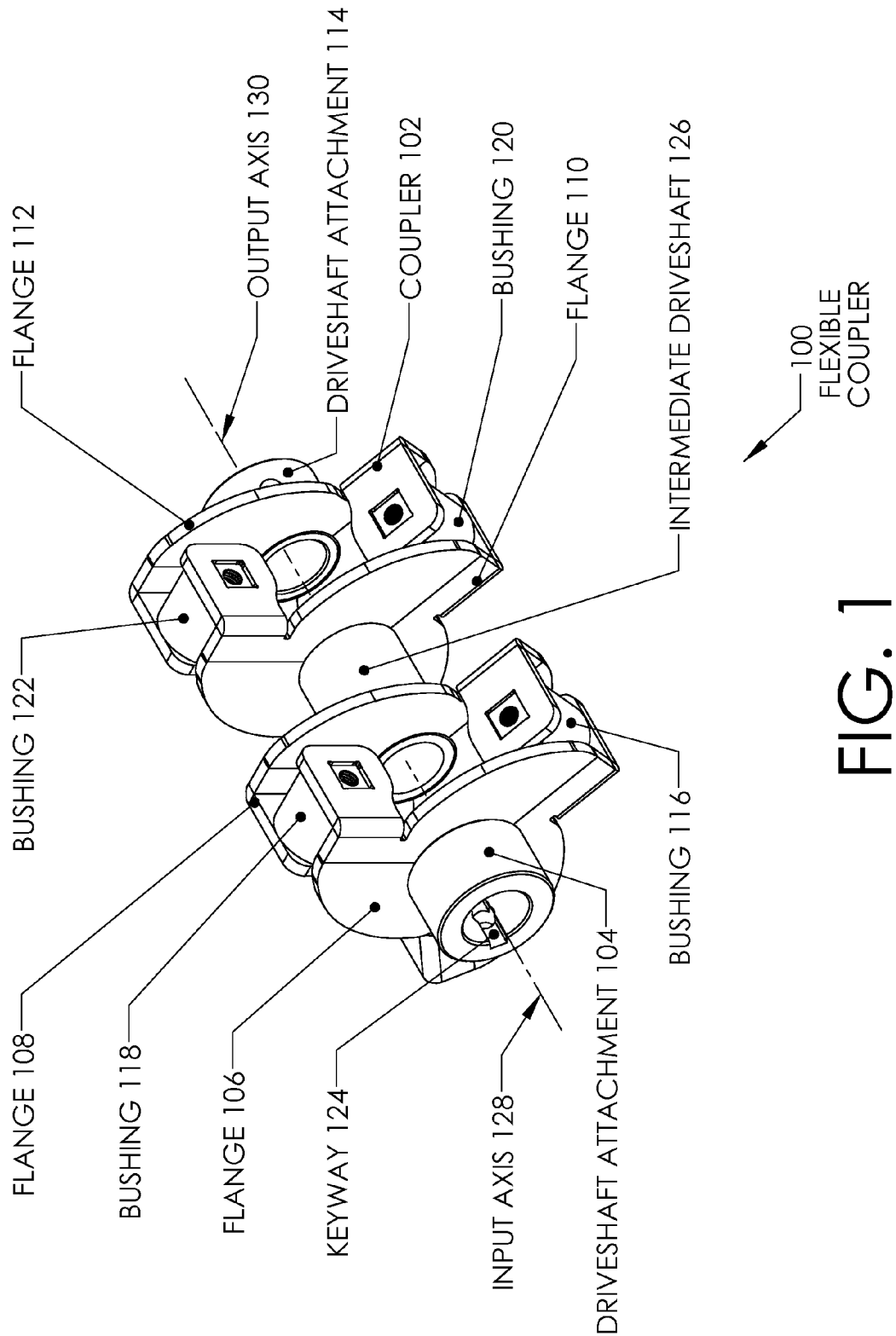
FIG. 1 is an isometric illustration of an embodiment showing a flexible coupler.

FIG. 1 is an isometric view of an embodiment 100 showing a flexible coupler 102. The flexible coupler 102 has a first set of flanges 106 and 108, and a second set of flanges 110 and 112. Each pair of flanges is joined by bushings that may be attached using fasteners (not shown). The bushings that are shown include bushings 116, 118, 120, and 122. Two bushings are not shown.

The bushings may allow some flexibility in the alignment of the input axis 128 and output axis 130 while transmitting the rotational energy from the input driveshaft attachment 104 to the output driveshaft attachment 114. The bushings may also provide some dampening or vibration minimization between two power transmission devices.

The flexible coupler 104 may be used to join any two power transmission devices. For example, a reciprocating engine may be attached to a powered implement. In such an application, the reciprocating engine and the implement may be mounted on a framework. However, when the engine and implement are mounted, there may be some misalignment between the driveshaft of the engine and implement. The flexible coupler 104 may mechanically couple the two driveshafts while allowing some misalignment.

If the coupler were not present, any misalignment of the engine and implement driveshafts would place a strain on the bearings of the engine and/or the implement, which could lead to premature failure.

The coupler may also minimize vibrations that may be transmitted from one driveshaft to another. In many applications, an implement may consume energy at different rates. For example, an implement may be a mowing deck that has several mower blades that are driven by a driveshaft. Such an implement may encounter rocks or other debris during use and may cause a shock to be transmitted along the driveshaft. The coupler may lessen the effects of the shock load through the bushings used in the coupler.

The bushings may be manufactured from rubber or other flexible material. Each end of the bushings may have a metal insert for attaching the bushings to the coupler. Each metal insert may have a threaded hole for attaching the bushing to a flange using a fastener.

The bushings may operate by allowing the metal inserts to move with respect to each other. In some cases, the metal inserts may move side to side, such that the axis of the threaded fasteners may remain parallel but may offset from each other. In such a movement, the flexible coupler may absorb any offset between the centerline axes of the input and output driveshafts.

The bushings may also operate by compressing and expanding in the axis of the threaded fasteners. In such movements, the bushings may absorb shock loads or minimize vibrations that may otherwise be passed from one driveshaft to another.

The bushings are mounted to the flanges such that the main axis of the bushings are tangential to a radius perpendicular to the input or output axes. Stated another way, the bushings are arranged in a circle around the rotational axis of the coupler. The circle may have a radius from the centerline of the coupler.

In embodiment 100, each flange has three bushings. Other embodiments may have two, four, five, six, or more bushings.

The flanges as illustrated may be manufactured from sheet metal. In such an embodiment, a flat pattern may be cut from a sheet metal, such as steel, and folded to form the tabs or attachment points for the bushings.

In other embodiments, the flanges may be manufactured from molded, cast, machined, or other manufacturing processes. In some cases, components of the flexible coupler may be manufactured from plastics, metals, ceramics, or other materials. The material selection may be dependent on the amount of the torsional forces, the sizes of the shafts, or other factors.

The flexible coupler 102 may attach to input and output driveshafts in many different manners. In the example of embodiment 100, driveshaft attachments 104 and 114 may each slip over a driveshaft and may engage the driveshaft using a key placed in a keyway 124. In some embodiments, a driveshaft attachment may have a spline, thread, taper, set screw, or other engagement mechanism. In some embodiments, a driveshaft may be welded directly to a flange.

In some embodiments, a flange may be bolted to a flywheel or other flange on an input or output driveshaft. In such embodiments, fasteners may secure a flange to an input or output driveshaft using a set of holes in the flange.

The flexible coupler 102 has two pairs of flanges that may be joined by an intermediate driveshaft 126. The arrangement of two pairs of flanges may allow the input and output axes 128 and 130 to be parallel but offset, as well as being out of parallel. Other embodiments may include just a single pair of flanges. Such embodiments may permit less offset or out-of-parallelism in the input and output axes yet still be effective in joining two driveshafts.

The length of the intermediate driveshaft may vary from one application to another. In some cases, the intermediate driveshaft may be one or two times the input shaft diameter, while in other cases, the intermediate driveshaft may be 5, 10, 20, 50, or more times the input shaft diameter.

Embodiments may be created for various nominal input shaft diameters. Some input shaft diameters may be one inch or less nominal diameters. Other embodiments may have nominal input shaft diameters of 1.5 in, 2.0 in, 2.5 in, 3.0 in, or larger.

Figure 2:
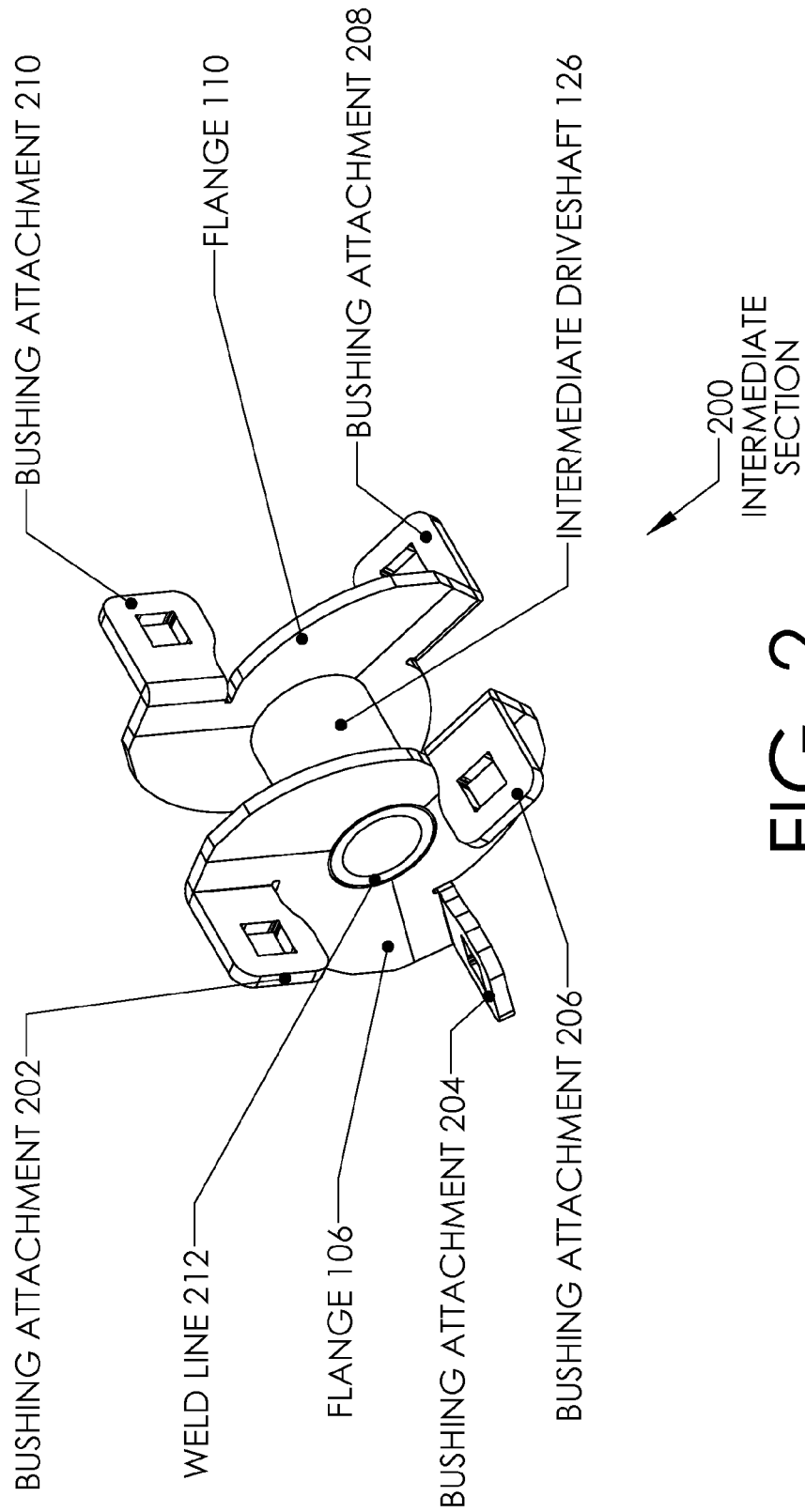
FIG. 2 is an isometric illustration of an embodiment showing an intermediate section of the flexible coupler of FIG. 1.

FIG. 2 is an isometric illustration of an embodiment 200 showing just an intermediate section of embodiment 100. Embodiment 200 shows the flanges 106 and 110 joined by intermediate driveshaft 126.

Embodiment 200 illustrates a view of the two innermost flanges that may be attached to the intermediate driveshaft. In many such embodiments, the flanges may be welded to the intermediate driveshaft, such as at the weld line 212.

The flange 106 may have three tabs or bushing attachments 202, 204, and 206. Similarly, flange 110 has two of the three bushing attachments 208 and 210 shown.

The design of flanges 106 and 110 are such that the same part may be used four times in the assembly of embodiment 100. Each of the flanges 106, 108, 110, and 112 may be formed of the identical sheet metal component, then welded or attached to the various driveshaft attachments or the intermediate driveshaft to complete the assembly.

The bushing attachments of embodiment 200 all contain a square hole. Such a feature may be an anti-rotation feature that engages a corresponding square protrusion on the bushings and prevents the bushings from rotating during installation. Other embodiments may have different types of anti-rotation features or other mechanisms for preventing a bushing from rotating during installation.

FIGS. 3A, 3B, and 3C illustrate isometric, front, and side views of a bushing, respectively.

FIG. 3A illustrates embodiment 300 showing an isometric view of a bushing. The bushing 302 may have a rubber sleeve or other flexible component 304 that has a metal insert 308 in both ends. The metal insert 308 may have a threaded hole 310 that may be used to fasten the bushing into a coupler.

The metal insert 308 may also include an anti-rotation feature 312. In embodiment 300, the anti-rotation feature 312 may be a raised square feature that may engage a corresponding square hole in a flange. The anti-rotation feature 312 may allow a fastener to engage the bushing without allowing the bushing to rotate while the fastener is tightened.

In many embodiments, the bushing 302 may be manufactured by casting rubber or other flexible material around two metal inserts. The metal inserts may have features, such as grooves, slots, or other features that may mechanically engage the rubber.

The metal inserts may be mechanically isolated from each other such that the inserts may move with respect to each other. The movement of the metal inserts may be dampened or restricted by the rubber that engages the inserts, but each insert may have some degree of freedom from the other insert.

FIG. 3B illustrates embodiment 322 showing an end view of a bushing. The metal insert 308 may be shown surrounded by the rubber component 304. The anti-rotation feature 312 may also be shown with the threaded hole 310.

FIG. 3C illustrates embodiment 324 showing a side view of a bushing. The rubber component 304 is illustrated, along with the anti-rotation features 312 and 320.

Embodiment 324 includes axes 326 and 328. In many embodiments, the bushing 302 may be able to flex in the rubber section 304. In such movements, the axis 326 for one metal insert may move with respect to the axis 328. In the illustration of embodiment 324, such movement may be up and down. The bushings are flexed in this manner when the flanges of a coupler are not parallel. Such a movement may happen when the input and output shafts of the flexible coupler are not parallel or may be parallel but offset and not aligned.

Figure 4:
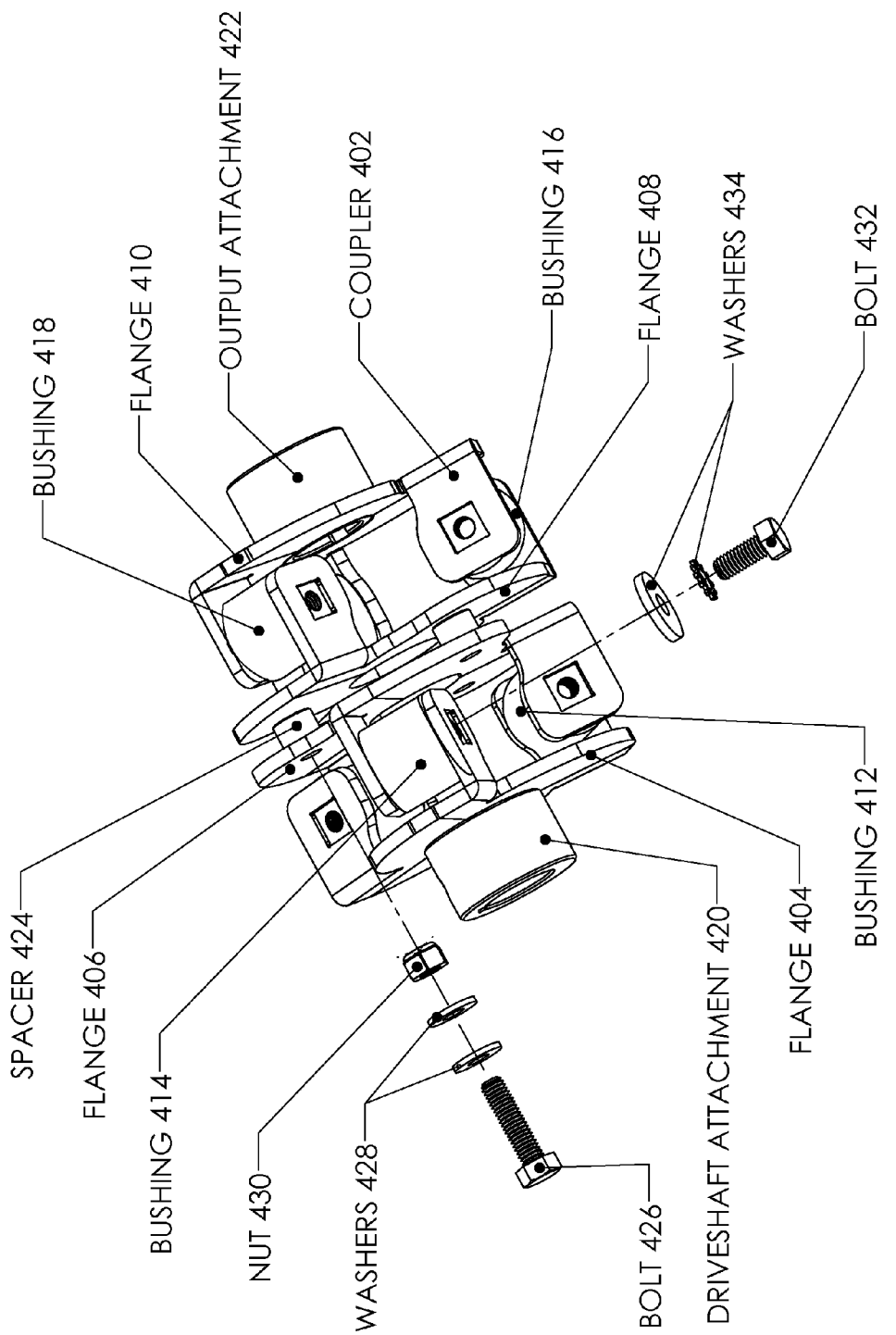
FIG. 4 is an isometric illustration of an embodiment showing a second embodiment of a flexible coupler.

FIG. 4 is an isometric illustration of embodiment 400 showing a flexible coupler 402 that has a set of spacers located between the innermost flanges. Embodiment 400 illustrates another embodiment of a flexible coupler where two pairs of flanges may be mounted very close to each other. Such an embodiment may provide some of the tolerance to misalignment and vibration dampening as embodiment 100, yet may be more compact for space limited applications.

The coupler 402 may have four flanges 404, 406, 408, and 410. Flanges 404 and 406 may be joined by bushings 412 and 414 plus one other bushing not shown. Flanges 408 and 410 may be joined by bushings 416 and 418 plus one other bushing not shown.

The flanges 406 and 408 may be joined by a set of spacers 424, one of which is shown, plus the bolt 426, washers 428, and nut 430. In many applications, the nut 430 may be a lock nut, as the coupler 402 may undergo severe vibration when turning at high speeds. In some embodiments, the spacers may be removed and the inner flanges may be bolted directly together.

Also illustrated in the embodiment 400 is a bolt 432 and washers 434 that may be used to attach flange 404 to the bushing 414. Other flanges and bushings may be attached using similar fasteners.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A flexible coupler comprising:
a first flange having an attachment to an input shaft and having a first plurality of attachment points, each of said attachment points being located at a radius from an input axis, each of said first plurality of attachment points having an anti-rotation receiver;
a second flange having an attachment to an output shaft and having a second plurality of attachment points corresponding with said first plurality of attachment points, each of said second plurality of attachment points having an anti-rotation receiver; and
a plurality of bushings, each of said bushings being attached at one end to said first flange and attached at a second end to said second flange, each of said bushings being cylindrical and having threaded receivers that attach said bushings to said attachment point with fasteners, each of said bushings comprising an anti-rotation feature that engages a corresponding one of said anti-rotation receivers.

2. The flexible coupler of claim 1, said first flange and said second flange being identical.

3. The flexible coupler of claim 1, said bushings being rubber bushings having:
a first attachment axis and a second attachment axis, said first attachment axis and said second attachment axis being parallel;
said bushings flexing such that said first attachment axis and said second attachment axis may be offset from each other when flexed.

4. The flexible coupler of claim 1, said anti-rotation feature being a square feature perpendicular to said first attachment axis.

5. A flexible coupler comprising:
a first flange having an input shaft attachment and having a first plurality of attachment points, each of said attachment points being located at a radius from an input axis;
a second flange having a second plurality of attachment points, each of said second attachment points being located at a radius from said input axis and corresponding with said first plurality of attachment points on said first flange;
a third flange attached to said second flange and having a third plurality of attachment points, each of said third attachment points being located at a radius from an intermediate axis;
a fourth flange having an output shaft attachment and having a fourth plurality of attachment points corresponding with said third plurality of attachment points on said third flange; and
a plurality of bushings, each of said bushings being attached between said attachment points on said first flange and second flange, and said third flange and said fourth flange, said bushings having threaded fastener receivers to receive fasteners at said attachment points, each of said plurality of bushings being cylindrical and having an anti-rotation feature that engages a corresponding feature in one of said flanges.

6. The flexible coupler of claim 5, said first flange being manufactured using formed sheet metal.

7. The flexible coupler of claim 5, said first flange being manufactured using a casting.

8. The flexible coupler of claim 5 further comprising an intermediate driveshaft attaching said second flange and said third flange.

9. The flexible coupler of claim 5, said second flange and said third flange being directly attached to each other.

10. The flexible coupler of claim 5, said second flange and said third flange being attached using a plurality of spacers joining said second flange and said third flange.

11. The flexible coupler of claim 5, said input shaft being equal to or greater than one inch nominal diameter.

12. The flexible coupler of claim 11, said input shaft being less than three inch nominal diameter.

13. The flexible coupler of claim 5, said first flange having three attachment points.

* * * * *